United States Patent [19]
Matsumoto et al.

[11] Patent Number: 5,995,574
[45] Date of Patent: Nov. 30, 1999

[54] INTEGRAL FORGED SHROUD FLANGE FOR A BOILING WATER REACTOR

[75] Inventors: Jack T. Matsumoto, Sunnyvale; Alex B. Fife, San Jose, both of Calif.

[73] Assignee: General Electric Company, Schenectady, N.Y.

[21] Appl. No.: 09/016,906

[22] Filed: Feb. 2, 1998

Related U.S. Application Data

[60] Provisional application No. 60/057,186, Aug. 29, 1997.

[51] Int. Cl.$^6$ .................................................. G21C 11/00
[52] U.S. Cl. ........................................... 376/287; 376/302
[58] Field of Search .................................... 376/287, 293, 376/294, 302

[56] References Cited

U.S. PATENT DOCUMENTS

| | | | |
|---|---|---|---|
| 5,521,951 | 5/1996 | Charnley et al. | 376/302 |
| 5,583,899 | 12/1996 | Relf | 376/287 |
| 5,600,690 | 2/1997 | Weems et al. | 376/302 |

*Primary Examiner*—Daniel D. Wasil
*Attorney, Agent, or Firm*—Armstrong Teasdale LLP

[57] ABSTRACT

A shroud including an integral track for mounting inspection and cleaning tooling is described. In one embodiment, the shroud includes substantially cylindrical first and second shroud sections having a main body with a first end and a second end. One shroud first end has a weld prepared surface. Each shroud section includes a ledge in an exterior surface adjacent the first end. A weld is formed between the weld prepared surface and the first end of the second shroud section. At the weld, the shroud is substantially geometrically balanced with equal material on both sides of the weld. A geometrically balanced weld provides the same heat sink characteristics on both sides of the weld, and allows for a more uniform distribution of weld residual stresses.

14 Claims, 4 Drawing Sheets

INTEGRAL FORGED SHROUD FLANGE FOR A BOILING WATER REACTOR

CROSS REFERENCE TO RELATED APPLICATION

This application claims the benefit of U.S. Provisional Application No. 60/057,186, filed Aug. 29, 1997.

FIELD OF THE INVENTION

This invention relates generally to boiling water nuclear reactors and more particularly, to shroud weld joints for shrouds of such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide. The core center axis is substantially coaxial with the center axis of the shroud, and the shroud is open at both ends so that water can flow up through the lower end of the shroud and out through the upper end of the shroud. The shroud, top guide, and core plate limit lateral movement of the core fuel bundles.

The shroud, due to its large size, is formed by welding a plurality of stainless steel cylindrical sections together. Specifically, respective ends of adjacent shroud sections are joined with a circumferential weld. The weld joint supports vertical and lateral loads associated with all modes of reactor operation.

The shroud welds, however, increase the susceptibility of the shroud material to a detrimental effect known as intergranular stress corrosion cracking (IGSCC). Typically, cracking may occur in the heat affected zone of the shroud welds. Currently, volumetric inspections are performed to detect and evaluate the extent of cracking. If the cracking is determined to be significant, repairs may be performed to re-establish the integrity of the weld joint by the addition of alternate load paths.

It would be desirable to provide a shroud which has welds that are easy to inspect and, if necessary, repair. It also would be desirable to provide such a shroud which does not add significant costs to the fabrication of the shroud.

SUMMARY OF THE INVENTION

These and other objects may be attained by a shroud including an integral track for mounting inspection and cleaning tooling. In one embodiment, the shroud includes substantially cylindrical first and second shroud sections. Each shroud section has a main body with a first end and a second end. The first shroud section first end has a weld prepared surface. Each shroud section includes a ledge in an exterior surface adjacent the first end.

A weld is formed between the weld prepared surface and the first end of the second shroud section. At the weld, the shroud is substantially geometrically balanced with equal material on both sides of the weld. A geometrically balanced weld provides the same heat sink characteristics on both sides of the weld, and allows for a more uniform distribution of weld residual stresses.

The above described shroud weld joint facilitates easy inspection and repair of shrouds. More particularly, such joint enables easier inspection of the weld material, the heat affected zone, and adjacent base material of the shroud weld joints. The integral tracks facilitate mounting of inspection fixtures (visual, ultrasonic, eddy current) and provide an accurate and repeatable reference. In addition, such joint enables easier installation of an alternate load path in the event that inspections and analysis show that the structural integrity of the weld joint requires such a path. Also, the weld joint reduces the risk of stress corrosion cracking. Particularly, minimizing the amount of weld filler material reduces the heat affected zone, and the joint has a geometrically balanced weld which promotes an even distribution of weld residual stresses. Such weld joint also does not add significant costs to the fabrication of the shroud.

DETAILED DESCRIPTION

Figure 1:
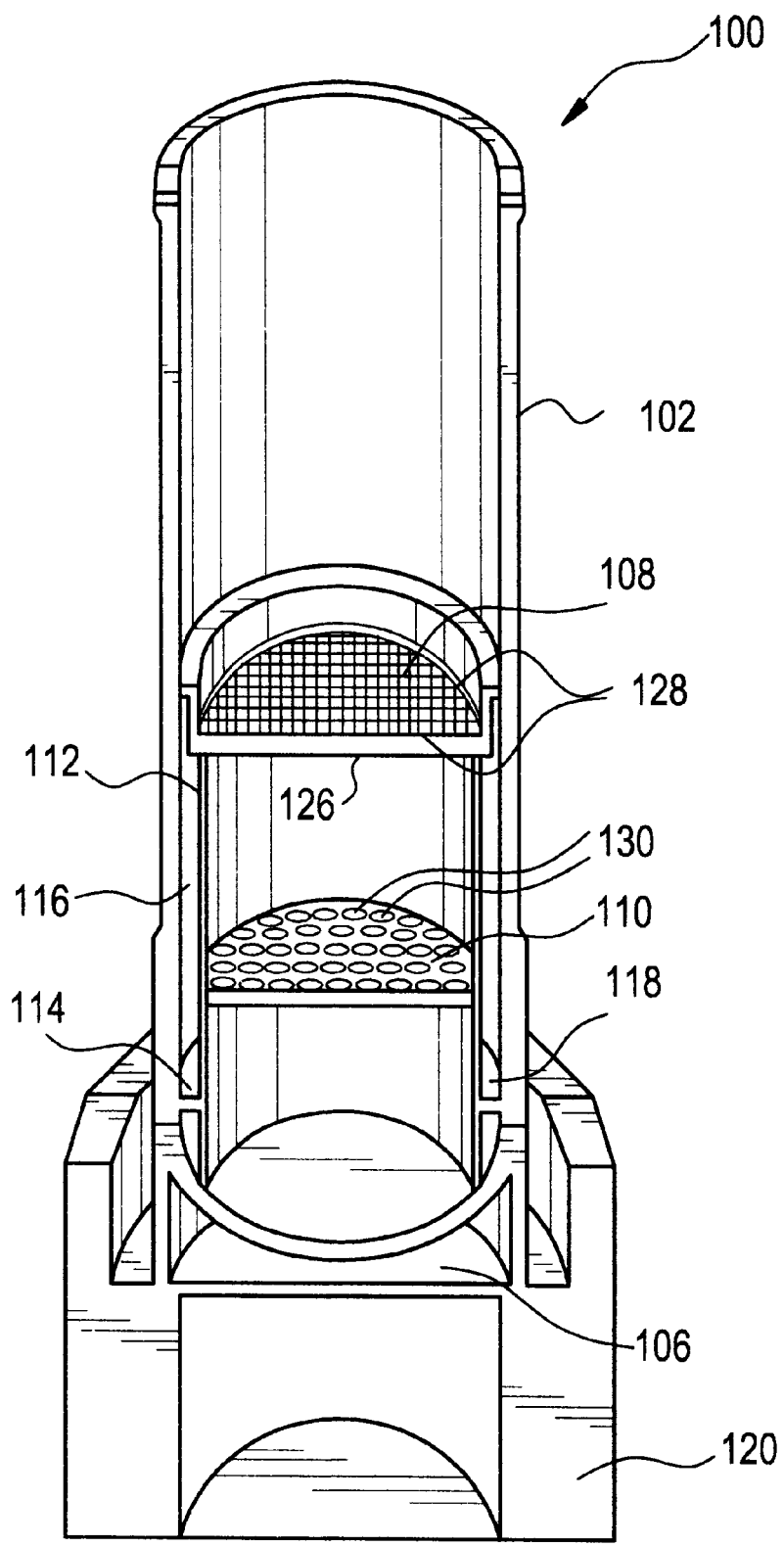
FIG. 1 is a schematic, partial cross section, illustration of a boiling water reactor.

FIG. 1 is a schematic, partial cross section, illustration of a boiling water reactor 100 including a reactor pressure vessel (RPV) 102. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102. RPV 102 is supported by an RPV support structure 120. RPV 102, of course, is filled with water.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported horizontally by core plate 110 and top guide beams 126. Shroud 112, core plate 110, and top guide 108 limit lateral movement of the core fuel bundles.

Shroud 112, due to its large size, is formed by welding a plurality of stainless steel cylindrical sections together.

Specifically, respective ends of adjacent shroud sections are joined with a circumferential weld. The weld joint supports vertical and lateral loads associated with all modes of reactor operation.

Figure 2:
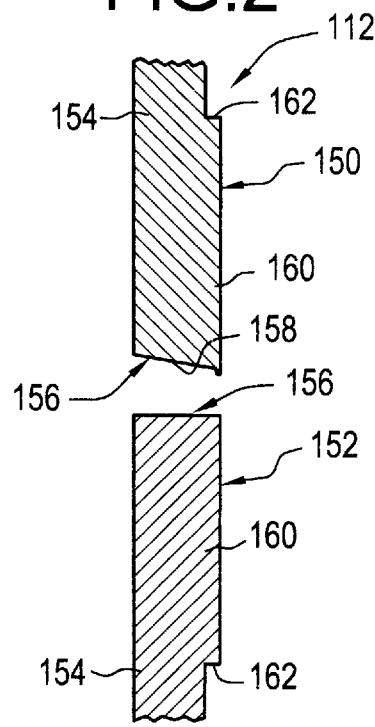
FIG. 2 is a cross sectional view through adjacent shroud sections prior to welding.

FIG. 2 is a cross sectional view through adjacent shroud sections 150 and 152 prior to welding. Each shroud section 150 and 152 includes a main body 154 having a first end 156 and a second end (not shown). Main body 154 has a substantially cylindrical shape. First end 156 of shroud section 150 has a weld prepared surface 158. Each shroud section 150 and 152 includes a ledge 162 in exterior surface 160 adjacent first end 156. Weld prepared surface 158 extends at an angle relative to a plane on which exterior surface 160 of shroud section 152 lies.

Figure 3:
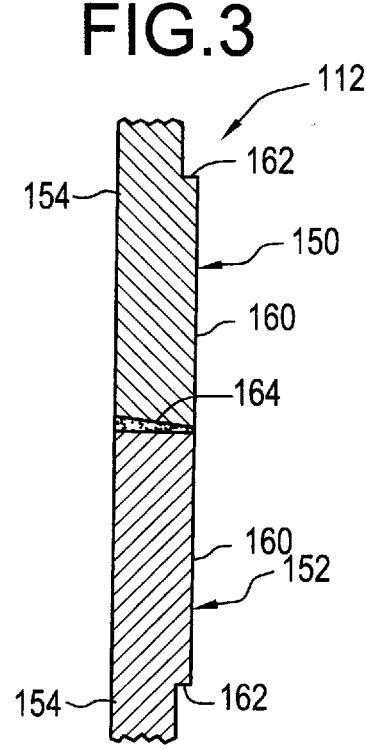
FIG. 3 is a cross section view through adjacent shroud sections subsequent to welding.

FIG. 3 is a cross section view through shroud sections 150 and 152 subsequent to welding. As shown in FIG. 3, a weld 164 is formed between weld prepared surface 158 and first end 156 of second shroud section 152. At weld 164, shroud 112 is substantially geometrically balanced with equal material on both sides of weld 164. Geometrically balanced weld 164 provides the same heat sink characteristics on both sides of weld 164, and allows for a more uniform distribution of weld residual stresses.

As described below in more detail, tapered ledges 162 can be used as a track to guide remotely operated fixtures. Ledges 162 also can be used to transfer externally applied loads to weld 164 in order to maintain the structural integrity of weld 164.

Figure 4:
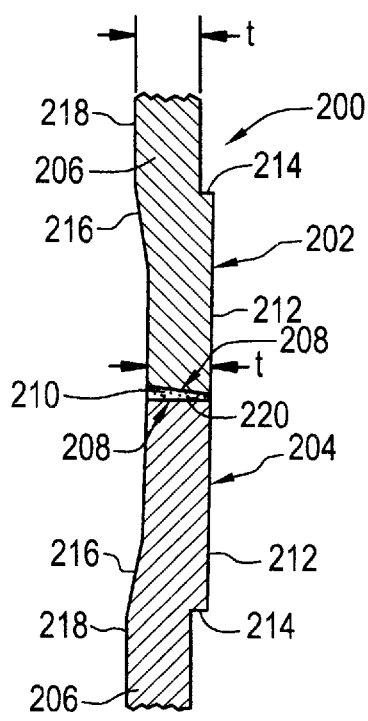
FIG. 4 is a cross sectional view through another embodiment of welded shroud sections.

FIG. 4 is a cross sectional view through another embodiment of a shroud 200 including welded shroud sections 202 and 204. Each shroud section 202 and 204 includes a main body 206 having a first end 208 and a second end (not shown). Main body 206 has a substantially cylindrical shape. First end 208 of shroud section 202 has a weld prepared surface 210. Weld prepared surface 210 extends at an angle relative to a plane on which exterior surface 212 of shroud section 202 lies.

Each shroud section 202 and 204 includes a ledge 214 in exterior surface 212 adjacent first end 208. Each section 202 and 204 also includes a tapered portion 216 in an interior surface 218 adjacent first end 208. Each shroud section 202 and 204 has a same thickness t at a location above tapered portion 216 as a shroud thickness t at a location below tapered portion 216.

A weld 220 is formed between weld prepared surface 210 and first end 208 of second shroud section 204. At weld 220, shroud 200 is substantially geometrically balanced with equal material on both sides of weld 220. At weld 220, thickness t of shroud 200 is decreased as compared to the weld configuration shown in FIG. 3. Reducing the shroud thickness at weld 220 provides the advantage of minimizing the amount of welding required.

Figure 5:
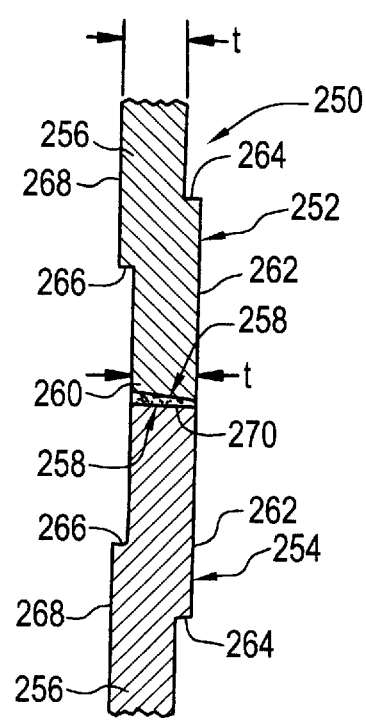
FIG. 5 is a cross sectional view through yet another embodiment of welded shroud sections.

FIG. 5 is a cross sectional view through yet another embodiment of a shroud 250 including welded shroud sections 252 and 254. Each shroud section 252 and 254 includes a main body 256 having a first end 258 and a second end (not shown). Main body 256 has a substantially cylindrical shape. First end 258 of shroud section 252 has a weld prepared surface 260. Weld prepared surface 260 extends at an angle relative to a plane on which exterior surface 262 of shroud section 252 lies.

Each shroud section 252 and 254 includes a ledge 264 in exterior surface 262 adjacent first end 258. Each section 252 and 254 also includes a ledge 266 in an interior surface 268 adjacent first end 258. Each shroud section 252 and 254 has a same thickness t at a location above interior ledge 266 as a shroud thickness t at a location below interior ledge 266. Interior tapered ledges 266 enable remotely operated fixtures to be mounted within the interior of shroud 250. Shroud 250 therefore has integral tracks for interior and exterior inspections and repairs.

A weld 270 is formed between weld prepared surface 260 and first end 258 of second shroud section 254. At weld 270, shroud 250 is substantially geometrically balanced with equal material on both sides of weld 270. As with weld 218, at weld 270, the thickness of shroud sections is decreased as compared to the weld configuration shown in FIG. 3.

Figure 6:
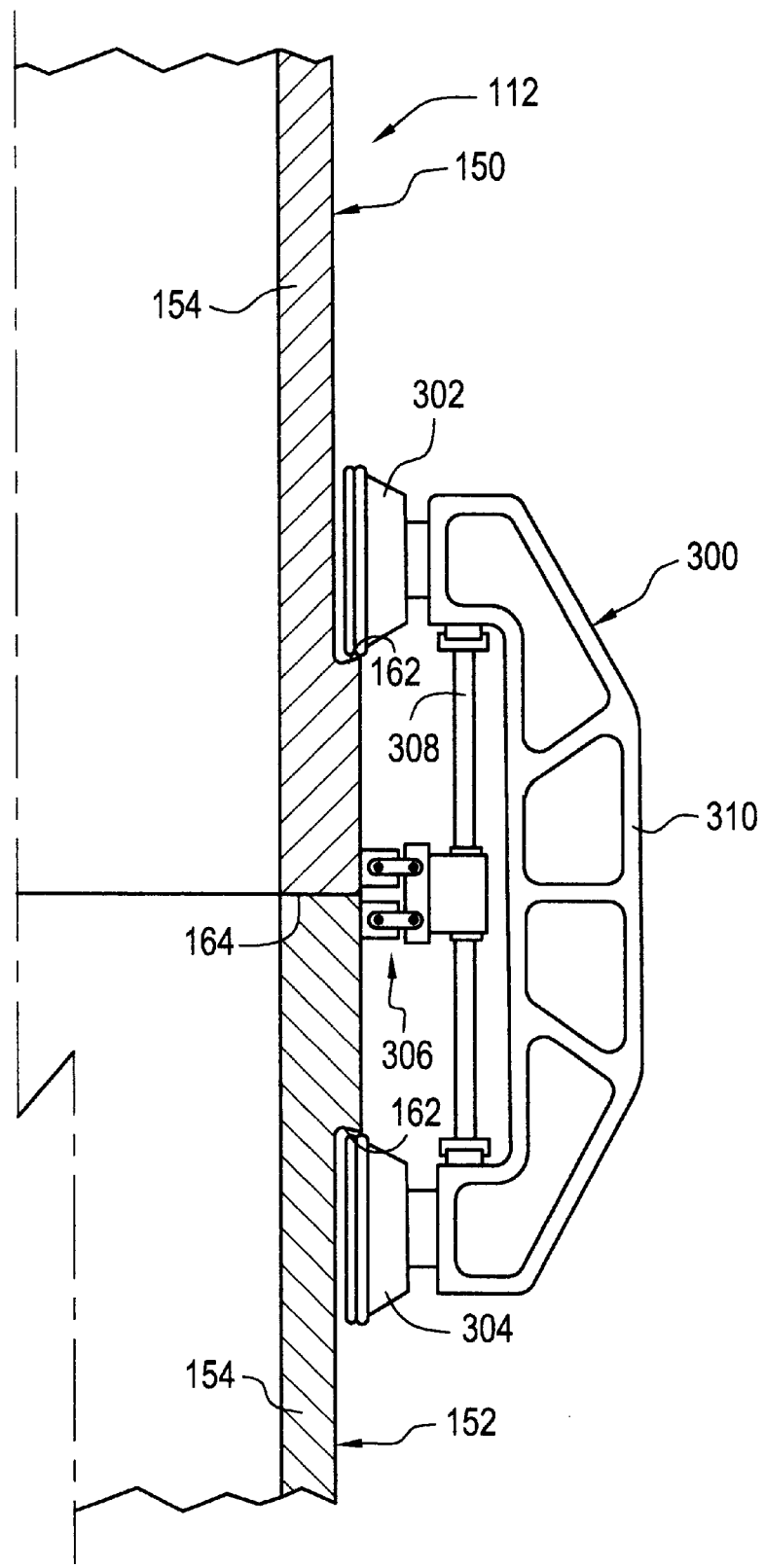
FIG. 6 is a partial cross sectional view through a section of a shroud and inspection tooling.

FIG. 6 is a partial cross sectional view through shroud 112 with inspection tooling 300 secured thereto. Tooling 300 includes a first engagement member 362 in contact with ledge 162 of shroud section 150, and a second engagement member 304 in contact with ledge 162 of shroud section 152. Inspection or repair components, such as transducers or cleaning tools 306, extend from a cross rail 308 supported by a cross member 310.

As shown in FIG. 6, tooling 300 can be remotely attached to the integral track form by ledges 162. Tooling 300, as shown, can traverse around shroud 112 parallel to weld 164. Tooling 300 such as inspection and cleaning tools can be mounted to the track.

Figure 7:
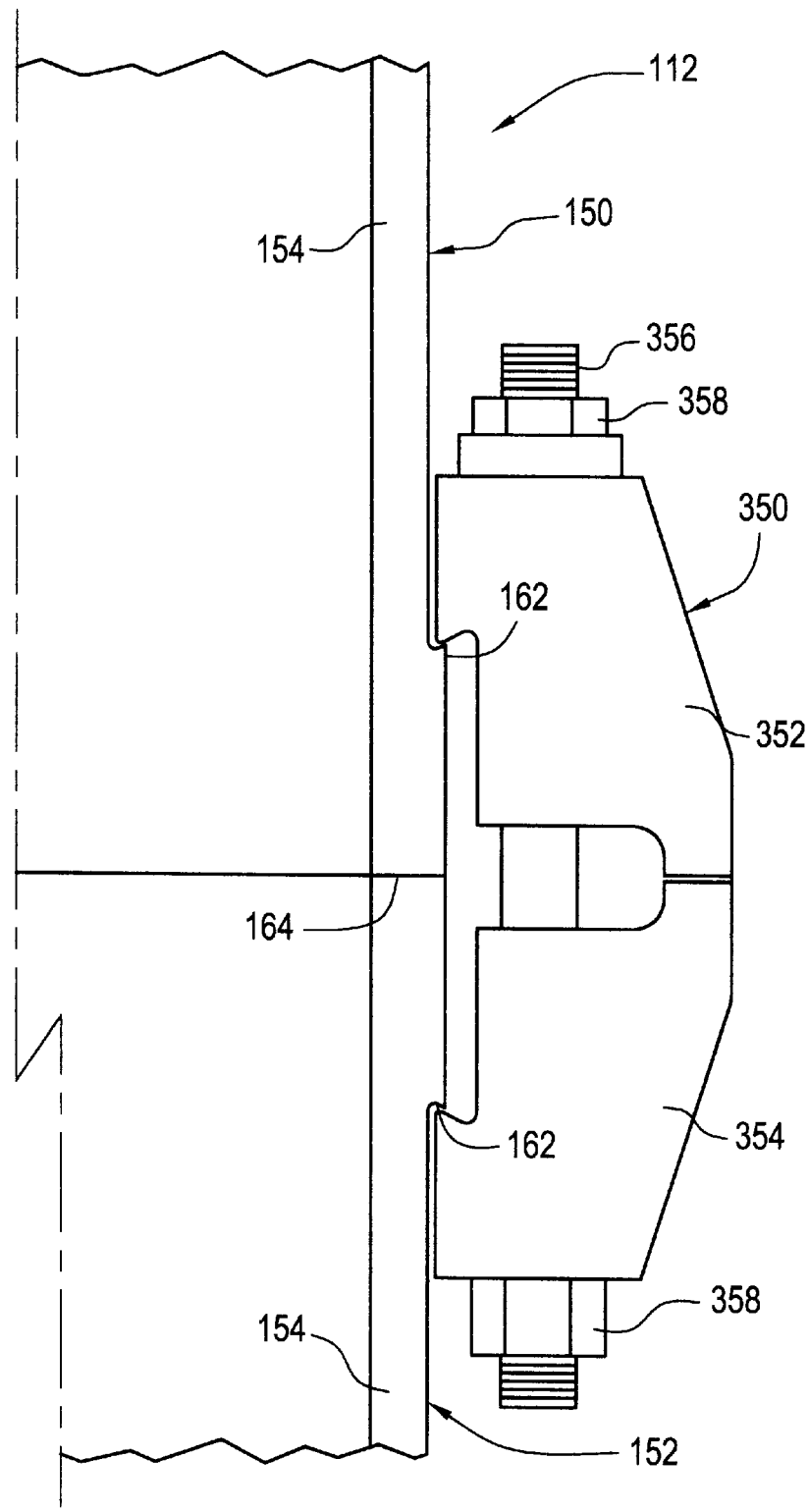
FIG. 7 is a partial cross sectional view through a section of a shroud and a clamp.

FIG. 7 is a partial cross sectional view through a section of shroud 112 with a clamp 350 secured thereto. Clamp 350 includes a first clamping section 352, a second clamping section 354, and a threaded stud 356 extending through first and second clamping sections 352 and 354 and secured thereto by nuts 358. First clamping section 352 is in contact with ledge 162 of first section 150 and second clamping section 354 is in contact with ledge 162 of second section 152. Clamps provides an alternate load path and applies a compressive load to weld 164. The number of clamps required would depend on loads at the specific joint.

The above described shroud weld joint facilitates easy inspection and repair of shrouds. More particularly, such joint enables easier inspection of the weld material, the heat affected zone, and adjacent base material of the shroud weld joints. The integral tracks facilitate mounting of inspection fixtures (visual, ultrasonic, eddy current) and provide an accurate and repeatable reference. In addition, such joint enables easier installation of an alternate load path in the event that inspections and analysis show that the structural integrity of the weld joint requires such a path. Also, the weld joint reduces the risk of stress corrosion cracking. Particularly, the joint has a geometrically balanced weld which promotes an even distribution of weld residual stresses. Such weld joint also does not add significant costs to the fabrication of the shroud.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, although the weld joint is described herein in connection with large cylindrical forgings such as shroud cylinders, the weld joint could be used to formed plates. Accordingly, the spirit and scope of the invention are to be limited only by the terms of the appended claims.

We claim:

1. A one-piece shroud section of a nuclear reactor, said shroud section comprising a main body having a first end and a second end, said first end having a weld prepared surface extending at an angle relative to a plane on which an exterior surface of said shroud section lies, said shroud section further comprising a ledge in said exterior surface of said shroud section main body adjacent said first end.

2. A shroud section in accordance with claim 1 wherein said main body has a substantially cylindrical shape.

3. A shroud section in accordance with claim 1 further comprising a ledge in an interior surface adjacent said first end.

4. A shroud section in accordance with claim 3 wherein said shroud section has a same thickness at a location above said ledge as a shroud thickness at a location below said ledge.

5. A shroud section in accordance with claim 1 further comprising an tapered portion in an interior surface adjacent said first end.

6. A shroud section in accordance with claim 5 wherein said shroud section has a same thickness at a location above said tapered portion as a shroud thickness at a location below said tapered section.

7. A shroud for a nuclear reactor, said shroud comprising:
   a first shroud section, said first shroud section comprising a main body having a first end and a second end, said first end having a weld prepared surface extending at an angle relative to a plane on which an exterior surface of said shroud section lies;
   a second shroud section comprising a main body having a first end and a second end;
   a weld joining said first and second shroud sections at said first shroud section first end and said second shroud section first end, said shroud substantially geometrically balanced adjacent both sides of said weld;
   a first integral ledge in said exterior surface of said first shroud section main body adjacent said first shroud section first end; and
   a second integral ledge in said exterior surface of said second shroud section main body adjacent said second shroud section first end.

8. A shroud in accordance with claim 7 wherein said first shroud section main body has a substantially cylindrical shape and said second shroud section main body has a substantially cylindrical shape.

9. A shroud in accordance with claim 7 further comprising a first ledge in an interior surface of said first shroud section adjacent said first shroud section first end, and a second ledge in an interior surface of said second shroud section adjacent said second shroud section first end.

10. A shroud in accordance with claim 9 wherein said first shroud section has a same thickness at a location above said first ledge as a shroud thickness at a location below said first ledge.

11. A shroud in accordance with claim 7 further comprising a first tapered portion in an interior surface of said first shroud section adjacent said first shroud section first end, and a second tapered portion in an interior surface of said second shroud section adjacent said second shroud section first end.

12. A shroud in accordance with claim 11 wherein said first shroud section has a same thickness at a location above said first tapered portion as a shroud thickness at a location below said first tapered portion.

13. A shroud in accordance with claim 7 further comprising clamps, said clamps comprising a first clamping section, a second clamping section, and a threaded stud extending through said first and second clamping section, said first clamping section in contact with said first integral ledge and said second clamping section in contact with said second integral ledge.

14. A shroud in accordance with claim 7 further comprising tooling secured thereto, said tooling comprising a first engagement member in contact with said first integral ledge, and a second engagement member in contact with said second integral ledge.

* * * * *